Patented Dec. 5, 1950

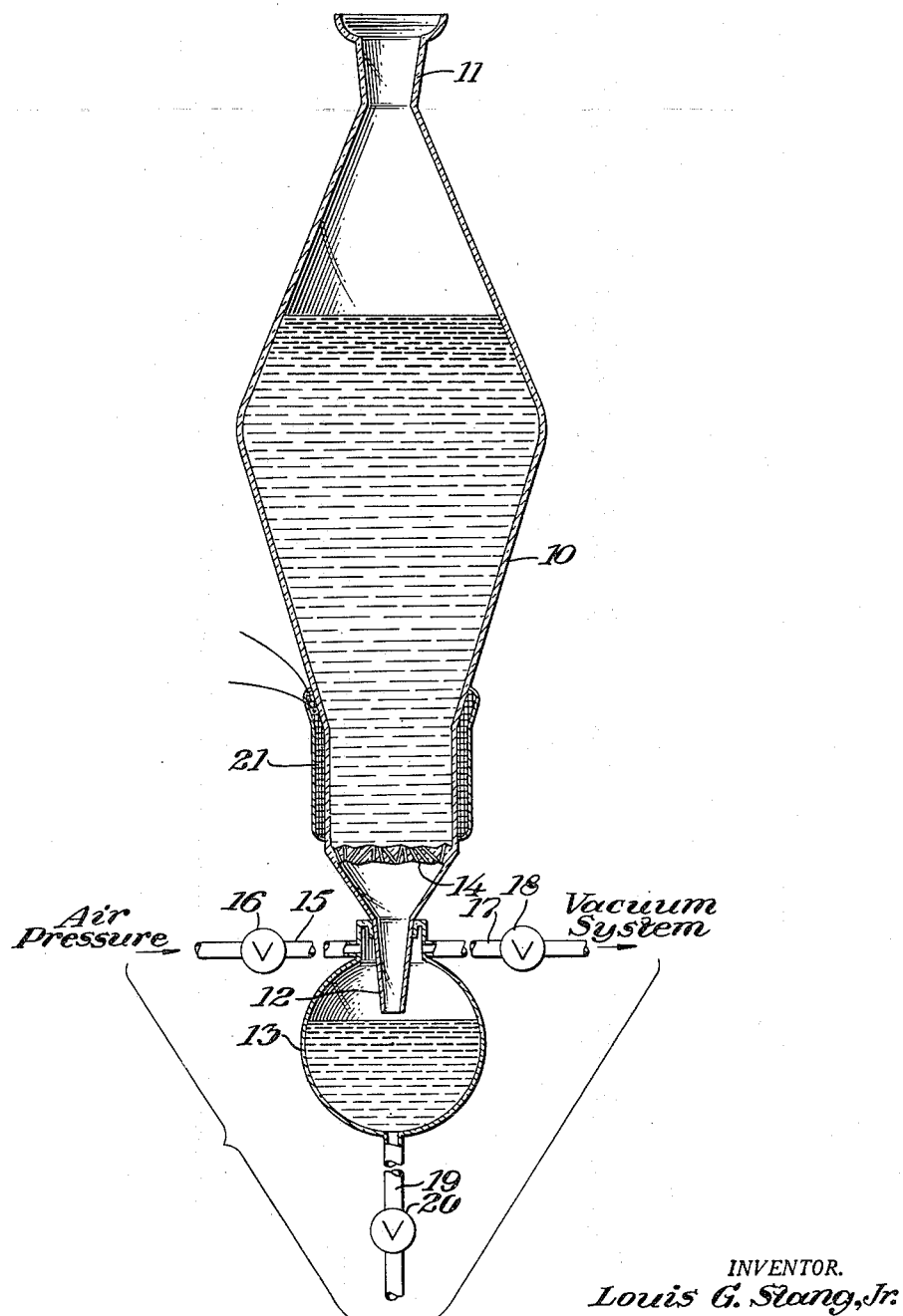

2,533,149

UNITED STATES PATENT OFFICE 2,533,149

PRECIPITATION PROCESS AND APPARATUS THEREFOR

Louis G. Stang, Jr., Chicago, Ill., assignor to the United States of America as represented by the United States Atomic Energy Commission Application April 25, 1946, Serial No. 664,957

4 Claims. (Cl. 23—1)

This invention relates to chemical treatment of substances and particularly to a method and apparatus for the isolation of materials by precipitation and filtration.

In many processes and especially in the processing of materials which are intensely radioactive, it is very important to be able to handle the materials and manipulate reactions from a remote location.

It is an object of the present invention to provide a method and apparatus to effect precipitation and filtration of radioactive substances by remote control.

Another object of the invention is to provide an arrangement for holding a liquid in position on a filter during precipitation and at will permitting filtering to occur.

Other objects and advantages of the invention include simplicity and the absence of moving mechanical parts.

In accordance with the preferred aspect of the invention, a liquid subsequently to be filtered is prevented from passing through the filter by air pressure which when removed permits filtering to take place.

The novel features which are believed to be characteristic of the invention are set forth in the appended claims. The invention itself, however, will best be understood by reference to the following description when read in connection with the accompanying drawing the single figure of which is a side view in section of an apparatus incorporating the invention.

Referring to the drawing, there is shown a reaction vessel 10 having at its top a neck portion 11 suitable for connection to an inlet tube, or the like, and at its bottom an outlet nozzle 12 extending into a suitable receptacle 13. Between the main body of the vessel 10 and the outlet nozzle 12 a porous member 14 is mounted for filtering a liquid in its passage from the vessel 10 to the outlet nozzle 12. The porous member 14 may be of any material suitable to perform the desired filtering action and robust enough to support the liquid in the vessel 10 prior to and during the filtering action. A sintered glass disc fused to the walls of the vessel 10 has been found quite satisfactory for use in precipitating and filtering of products resulting from the fission of uranium.

The receiving chamber or receptacle 13, which makes a gas tight seal with the nozzle 12, is provided with a conduit 15 connecting it through a valve 16 to any suitable supply (not shown) of air or other gas under pressure. Another conduit 17 connects the chamber 13 through a valve 18 to a vacuum system (not shown). In the bottom of the chamber 13 a drainage pipe 19 having a valve 20 is provided for removing filtrate from the chamber 13. If desired a heating coil 21 may be provided near the bottom portion of the vessel 10. It will be understood that in handling radioactive materials the valves 16, 18 and 20 will be located at or be operated from a distance.

In the operation of the apparatus and method of the invention, the valve 16 is opened to introduce air under pressure into the chamber 13 and hence to the under surface of the porous material 14, and the liquid in which reaction or precipitation is to occur is introduced through the neck 11 into the vessel 10. Such air under pressure prevents passage of the liquid through the porous material 14. As will be apparent to those skilled in the art, this prevention of liquid flow results from the air pressure below the porous material 14 at least balancing the hydrostatic pressure of the liquid at the bottom of the pores. On completion of the reaction or precipitation within the vessel 10, the valve 16 is closed to cut off the flow of air under pressure and the valve 18 is opened to the vacuum line whereby the liquid in the vessel 10 passes through the porous filter member 14 into the receiving chamber 13 leaving the precipitate on the porous member 14.

It will be evident that the above described procedure wherein liquid within a vessel is maintained above a porous member by introducing air or other gas beneath the member, and subsequently the pressure beneath the porous member is reduced to suck the liquid through the member to effect filtration, enable precipitating and filtering operations to be controlled from a distance to avoid exposure of personnel to radioactivity present in the solutions treated.

It is to be understood that the invention is not limited to the specific embodiment which has been described in detail in order to explain how the invention may be practiced but is of the scope of the appended claims.

I claim:

1. In a process in which a chemical reaction is effected in a liquid and the reacted product is filtered through a porous filter medium which is chemically inert to both the reactant liquid and the reacted product, the steps for effecting said process by remotely controllable operations which comprise concurrently positioning said liquid, prior to effecting the said reaction, in contact with the anti-gravity side of said filter medium while applying a gas at super-atmospheric pressure to the gravity side of said filter medium to balance the hydrostatic pressure of said liquid, and after the completion of the said reaction reducing the pressure on the gravity side of said filter medium substantially below said hydrostatic pressure.

2. The process of claim 1 in which the chemical reaction is a precipitation reaction and the pressure on the gravity side of the filter medium is reduced after the completion of the precipitation reaction to a sub-atmospheric pressure.

3. In an apparatus adapted to remotely controllable operation for the retention of a liquid during precipitation of a solid therefrom and subsequent filtration of the resulting suspension, the combination of a chamber having a porous bottom member, a zone adjacent the under side of said porous bottom member, a conduit connecting said zone with a source of gas under super-atmospheric pressure, a second conduit connecting said zone with a vacuum system, and means for controlling the flow of gas through said conduits.

4. In an apparatus adapted to remotely controllable operation for the retention of a liquid during precipitation of a solid therefrom and subsequent filtration of the resulting suspension, the combination of an upper chamber, a lower chamber communicating with said upper chamber through a porous dividing member, a conduit connecting said lower chamber with a source of gas under super-atmospheric pressure, a second conduit connecting said lower chamber with a vacuum system, and an adjustable valve in each of said conduits.

LOUIS G. STANG, Jr.

REFERENCES CITED

The following references are of record in the file of this patent:

UNITED STATES PATENTS

| Number | Name | Date |
|---|---|---|
| 653,160 | Williamson | July 3, 1900 |
| 668,344 | Wilson | Feb. 19, 1901 |
| 1,309,330 | Moore | July 8, 1919 |
| 1,311,017 | Skoglund | July 22, 1919 |
| 1,316,789 | Grimwood | Sept. 23, 1919 |
| 1,620,815 | Herschkowitsch et al. | Mar. 15, 1927 |

FOREIGN PATENTS

| Number | Country | Date |
|---|---|---|
| 641,844 | Germany | Feb. 15, 1937 |